(No Model.)
E. F. BARTON.
TONGS.
No. 405,001. Patented June 11, 1889.
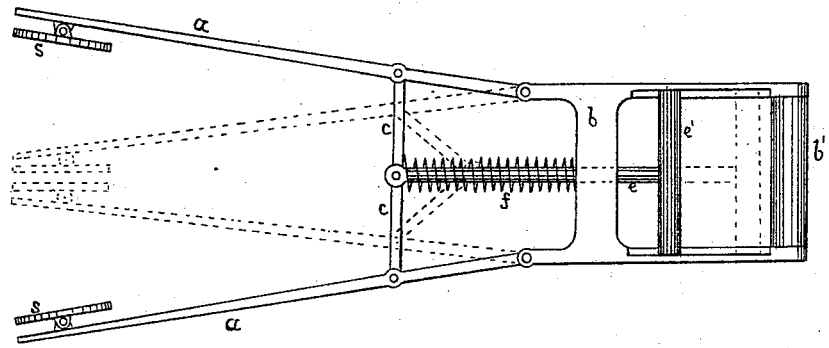
Attest
Geo. F. Robinson
J. H. Dussel
Inventor
Edward F. Barton
per Bradford Howland
Attorney

UNITED STATES PATENT OFFICE.

EDWARD F. BARTON, OF RAVENNA, OHIO, ASSIGNOR OF ONE-HALF TO ADALINE COY, OF SAME PLACE.

TONGS.

SPECIFICATION forming part of Letters Patent No. 405,001, dated June 11, 1889.

Application filed March 29, 1888. Serial No. 268,772. (No model.)

*To all whom it may concern:*

Be it known that I, EDWARD F. BARTON, a citizen of the United States, residing at Ravenna, in the county of Portage and State of Ohio, have invented a new and useful Improvement in Tongs, of which the following is a specification.

My invention relates to tongs adapted to be held and used by one hand, and to be operated by means of two struts connected with the arms of the tongs and a slidling rod formed at one end with a T-shaped handle.

The drawing forming a part of this specification is a plan of the tongs embodying my invention.

The arms $a\ a$ are hinged to the outer ends or corners of frame $b$, formed with an open handle $b'$. Struts $c\ c$ are hinged to arms $a\ a$ and to the sliding rod $e$, formed with a T-shaped handle $e'$, whose lateral ends slide on the sides of frame $b$, thereby preventing the turning or displacement of handle $e'$ and retaining it in the same plane with handle $b'$ and the arms $a\ a$ of the tongs. Frame $b$ is perforated to receive sliding rod $e$. Spring $f$ on rod $e$ keeps the tongs open, as shown, when they are not in use. Handles $b'$ and $e'$ are arranged at a suitable distance apart for the hand to grasp them both, and by drawing handle $e'$ toward handle $b'$ the tongs may be closed.

The positions of the several parts when the tongs are closed are indicated by dotted lines. When the handles are released, the action of spring $f$ opens the tongs. Near their outer ends they are provided with hinged holders $s\ s$, that are self-adjusting to the article to be grasped by them.

I claim as my invention—

As an article of manufacture, tongs formed with an open stationary handle $b'$, and a sliding T-shaped handle $e'$ within the same, the lateral ends of the T-shaped handle arranged to slide in contact with the sides of the open handle $b'$, both handles being in the same plane with the arms $a\ a$ and adapted to be grasped and operated with one hand, said handles being in combination with each other, frame $b$, arms $a\ a$, hinged at one end to the outer corners of frame $b$, struts or links $c\ c$, sliding rod $e$, frame $b$ being perforated to receive said rod, and spring $f$, substantially as and for the purpose described.

EDWARD F. BARTON.

Witnesses:
BRADFORD HOWLAND,
GEO. F. ROBINSON.